(12) United States Patent
Zhang

(10) Patent No.: US 8,042,166 B2
(45) Date of Patent: Oct. 18, 2011

(54) PRINTING VIA USER EQUIPMENT

(75) Inventor: Defu Zhang, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1400 days.

(21) Appl. No.: 11/259,285

(22) Filed: Oct. 26, 2005

(65) Prior Publication Data

US 2007/0091329 A1  Apr. 26, 2007

(51) Int. Cl.
*G06F 9/00* (2006.01)
(52) U.S. Cl. .......................... 726/11; 358/1.15
(58) Field of Classification Search .............. 726/11, 726/12, 13, 21; 380/51, 55; 358/1.1, 1.13–1.16; 709/225, 229, 219; 400/103, 104, 105
See application file for complete search history.

(56) References Cited

U.S. PATENT DOCUMENTS

| | | | |
|---|---|---|---|
| 6,351,317 B1 * | 2/2002 | Sasaki et al. | 358/1.15 |
| 6,470,387 B1 * | 10/2002 | Fischer | 709/224 |
| 6,980,319 B2 * | 12/2005 | Ohta | 358/1.18 |
| 7,173,728 B2 * | 2/2007 | Suzuki et al. | 358/1.15 |
| 7,298,518 B2 * | 11/2007 | Fujitani et al. | 358/1.15 |
| 7,409,452 B2 * | 8/2008 | Ragnet et al. | 709/227 |
| 7,747,699 B2 * | 6/2010 | Prueitt et al. | 709/219 |
| 7,917,171 B2 * | 3/2011 | Silverbrook et al. | 455/556.1 |
| 2001/0044783 A1 * | 11/2001 | Weisberg et al. | 705/62 |
| 2002/0122201 A1 * | 9/2002 | Haraguchi et al. | 358/1.15 |
| 2003/0002072 A1 * | 1/2003 | Berkema et al. | 358/1.15 |
| 2003/0002073 A1 * | 1/2003 | Berkema et al. | 358/1.15 |
| 2003/0078965 A1 * | 4/2003 | Cocotis et al. | 709/203 |
| 2003/0099353 A1 * | 5/2003 | Goh et al. | 380/51 |
| 2003/0151333 A1 * | 8/2003 | Chen | 312/223.2 |
| 2003/0151762 A1 * | 8/2003 | Cherry et al. | 358/1.14 |
| 2004/0207867 A1 * | 10/2004 | Stringham | 358/1.15 |
| 2005/0033991 A1 * | 2/2005 | Crane | 713/201 |
| 2005/0050213 A1 * | 3/2005 | Clough et al. | 709/229 |
| 2005/0060341 A1 * | 3/2005 | Shiina | 707/102 |
| 2005/0108574 A1 * | 5/2005 | Haenel et al. | 713/201 |
| 2005/0132094 A1 * | 6/2005 | Wu | 710/8 |
| 2005/0235077 A1 * | 10/2005 | Kubota | 710/62 |
| 2007/0076253 A1 * | 4/2007 | Shima | 358/1.15 |

\* cited by examiner

*Primary Examiner* — Eleni Shiferaw
*Assistant Examiner* — Abu Sholeman

(57) ABSTRACT

In one embodiment of a method of printing in a network, a connection is established from a user equipment to a printing system. A secure connection is established between the user equipment and a server. From the user equipment, a file on the server is selected. From the user equipment, information indicating the file and information indicating a path from the printing system to the server via the user equipment is passed to the printing system. The printing system is caused to retrieve the file from the server via the path. The printing system is caused to print information contained in the file.

21 Claims, 2 Drawing Sheets

PRINTING VIA USER EQUIPMENT

BACKGROUND

It is not unusual for a person using a mobile user equipment to wish to access computing resources. For example, a person traveling may wish to access computing resources of an enterprise network associated with the traveler's regular place of business. Because of concerns about security, the enterprise network may be protected by a "firewall," a system that is intended to prevent unauthorized and undesired access to the enterprise network. For example, the firewall may deny access except from specific "trusted" devices.

If a traveling user with a notebook computer that is trusted by the network wishes, for example, to print a document that is stored on the enterprise network to a printer outside the firewall, the user may download the file to the trusted notebook computer, and then send the file from the notebook computer to the printer in a separate transaction not implicating the firewall.

However, many people use devices such as a wireless e-mail device or a "smart phone" with e-mail or text messaging capability that does not allow the downloading of a document for printing. It is a common experience to receive an e-mail with an attached document, and be unable to open or read the attachment because the mobile device does not have sufficient memory capacity or display capability to handle the attachment.

One solution to this problem is "print by reference," in which the user sends to a print server associated with the printer a reference to a document that is to be printed, which may be in the form of a network address such as an internet URL and a filename, and the print server retrieves the document directly from the enterprise server, bypassing the limited capability of the mobile device. However, with a strong firewall there may be no way of permitting the print server to retrieve the file through the firewall.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, example of which is illustrated in the accompanying drawings.

Figure 1:
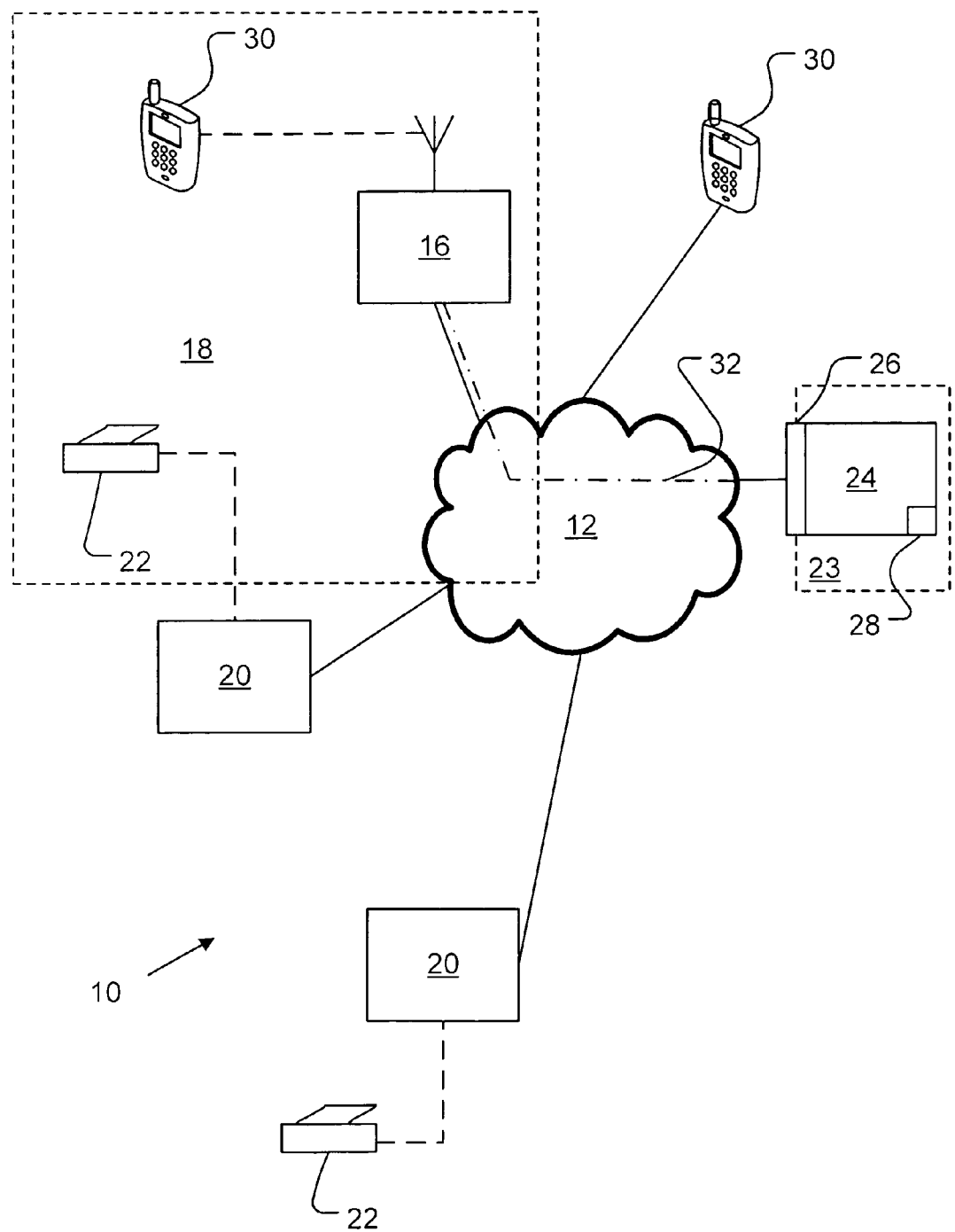
FIG. 1 is a block diagram parts of a computer network.

Referring to the drawings, and initially to FIG. 1, one embodiment of a computer system indicated generally by the reference numeral 10 comprises a public network 12 connecting various devices.

The devices connected to the network 12 may include a wireless transmitter/receiver 16, which may define a hotspot 18 or may be, for example, part of a cellular network providing general wireless coverage, a printing system comprising a print server 20 controlling a printer 22, and an enterprise network 23 comprising an enterprise server 24.

The print server 20 may include application software capable of interpreting data file formats from common application programs and a printer driver for the printer 22 so that the printer 22 and print server 20 together can receive, interpret, and print a file that is received in the user data saving format of common application programs such as word processors, spreadsheets, graphics packages, etc.

In an embodiment, the public network 12 is, includes, or is in communication with, the internet, and the enterprise network 23 may be anywhere on the internet. The enterprise network 23 is protected by a firewall 26, which may be implemented as a separate device or may be a logical function of the enterprise server 24. The enterprise server 24 may be part of an enterprise intranet (not shown) behind the firewall 26. The enterprise server 24 stores files including a document 28.

A mobile user equipment 30, which may be, for example, a smart phone, may be present in the hotspot 18, and may be in communication with the transmitter/receiver 16 and thereby with the network 12. Alternatively, the user equipment 30 may be connected to the public network 12 in another way, for example, by a wired connection. As shown in FIG. 1, especially in the case of the hotspot 18, the printer 22 may be near to the transmitter/receiver 16. Alternatively, the printer 22 may be anywhere on the network 12, especially if a document to be printed is for the use of a person other than a user of the user equipment 30.

The user equipment 30 is trusted by the firewall 26, and is equipped to establish and maintain a secure connection with enterprise server 24, shown symbolically by a chain-dotted line 32 in FIG. 1. The secure connection 32 may form a Virtual Private Network (VPN) effectively extending the enterprise network 23 to include the user equipment 30. Once the secure connection 32 is established and the user equipment 30 has authenticated itself to the firewall 26, the user equipment 30 is permitted to access and retrieve the document 28.

The user equipment 30 is also equipped to establish connections with other devices on the network 12, for example, with the print server 20.

Figure 2:
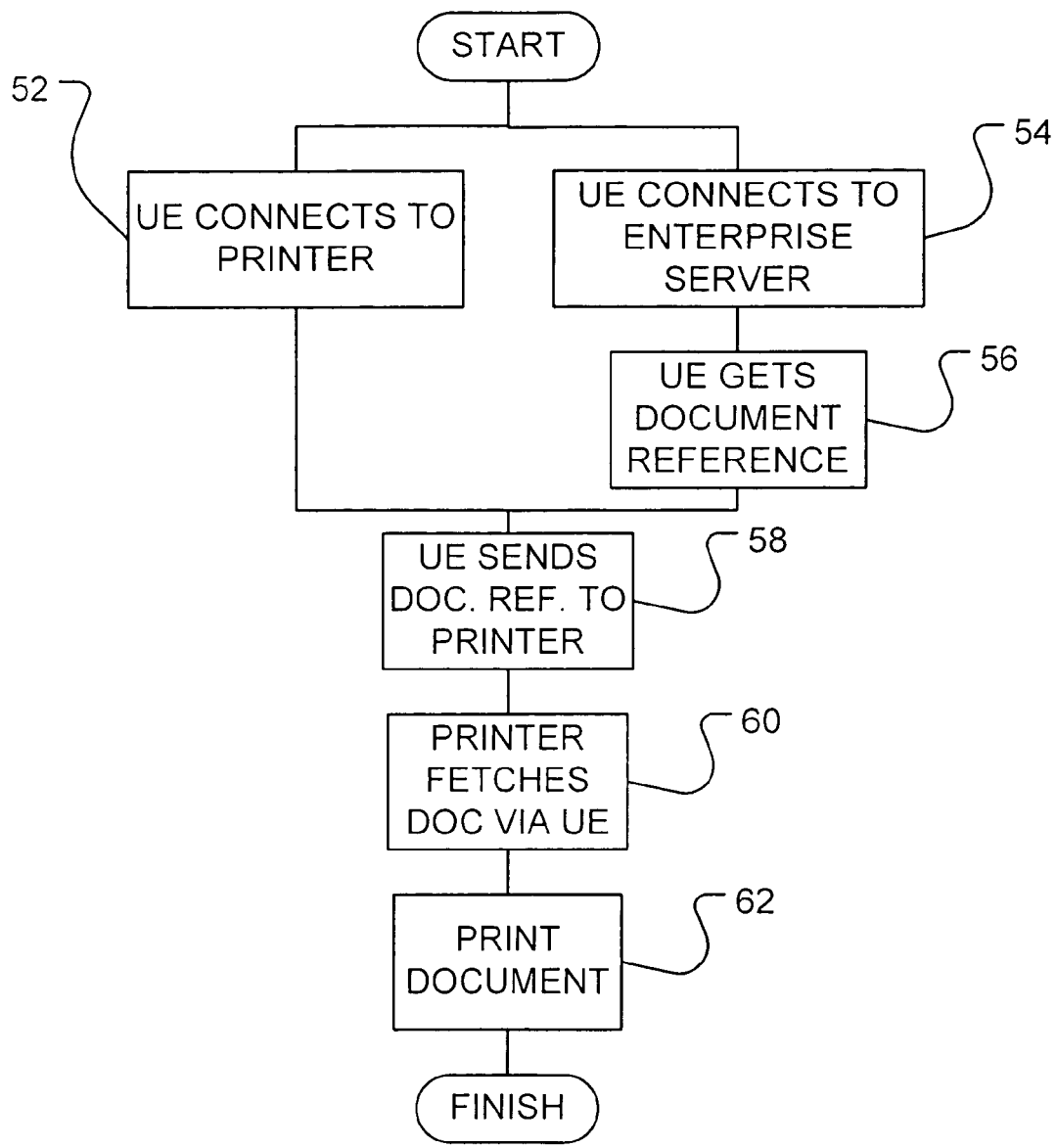
FIG. 2 is a flowchart of an embodiment of a method according to the invention.

Referring now to FIG. 2, in a method embodiment of the invention, a user equipment 30, for example, a wireless e-mail device, first connects itself to the public network 12. The connection process may comply with the standard protocols of the network and, in the interests of simplicity, is not shown in FIG. 2.

In step 52 the user equipment 30 establishes a IP connection with a print server 20 that controls a printer 22

In step 54, the user equipment 30 authenticates itself to the firewall 26 and establishes a VPN connection 32 with the enterprise server 24. Steps 52 and 54 may occur in either order. For example, the user of the user equipment 30 may be connected to the enterprise server 24 to check e-mail, and may connect to the print server 20 only when the user finds that he or she needs to print out a document 28 that is an e-mail attachment. For example, the user equipment 30 may be attached to the network 12, including a nearby printer 22, for purposes that do not require the VPN connection 32, and may establish the VPN connection 32 only when it becomes necessary for the user to access the document 28. For example, the user may already know about the document 28, and may establish the connection to the print server 20 and the VPN connection 32 to the enterprise server 24 only when the user wishes to print out the document.

In step 56, the user equipment 30 optionally obtains a reference identifying the document 28, which may comprise a filename for the document 28 and a location of the document 28 within the VPN comprising the enterprise server 24. In the embodiment shown in FIG. 2, the user equipment contacts the enterprise server 24 to obtain, or at least verify, the existence and location of the document 28, so step 56 is shown as following step 54. Alternatively, the user equipment 30 may receive a precise reference to the document 28 before establishing the secure connection to the enterprise server 24 in step 54. For example, the location of the document 28 may already be stored on the user equipment 30 or known to the user of the user equipment 30.

In step 58, the user equipment 30 sends to the print server 20 instructions to print the document 28 and a reference to the document 28 located on the enterprise server 24. The reference sent to the print server 20 includes the current address of the user equipment 30 within the public network 12. The reference sent to the print server 20 may also include the filename and address of the document 28 within the enterprise network 23. Alternatively, the reference sent to the print server 20 may be in a form meaningful only to the user equipment 30, in order not to disclose publicly unnecessary information about the internal structure of the private network.

In step 60, the print server 20 sends to the user equipment 30 a request for the enterprise server 24 to supply the print server 20 with a copy of the document 28. In the request, the print server 20 identifies the document 28 by the reference provided in step 58. The user equipment 30, which is acting effectively as part of the enterprise network 23, may read the message to confirm that it consists solely of a proper request for the document 28, and no undesirable content has been added by the print server 20 or by any intermediate device between the print server 20 and the user equipment 30.

If the reference to the document 28 in the request does not contain the location and filename of the document 28 on the enterprise server 24, the user equipment provides that information. The user equipment 30 then sends the request on to the enterprise server 24. The enterprise server 24 receives the request, and perceives the request as coming from the user equipment 30. The user equipment 30 is within the enterprise network 23 and entitled to obtain the document 28, so the enterprise server 24 complies with the request and sends the document 28. When the document 28 arrives at the user equipment 30, the user equipment 30 routes the packets of the document 28 to the print server 20.

In the embodiment shown in FIG. 2, a large file is transmitted as a stream of packets, each of which is sufficiently small to be handled by the user equipment 30. The user equipment 30 receives the packets from the enterprise server 24 and forwards the packets to the print server 20 as they are received, without attempting to treat the document 28 as a whole. The user equipment 30 can thus route an indefinitely large document 28 from the enterprise server 24 to the print server 20 without being constrained by the limited memory capacity of the user equipment 30. In addition, the document 28 may be stored on the enterprise server 24 in an editable format, which may be small compared with, for example, a rasterized printer format. The user equipment 30 can pass the packets forming the document 28 out without prejudicing the security of the enterprise network 23. The user equipment 30 does not permit any packets or other messages to enter the enterprise network 23. If return packets are required for verification as part of the transmission protocol being used, then the user equipment 30 receives the verification packets from the print server 20 independently of sending verification packets to the enterprise server 24.

In step 62, the print server 20 converts the document 28, if necessary, into a printer format, and sends the document 28 to the printer 22. The printer 22 prints the document. Once the entire document 28 has arrived at the print server 20, the VPN connection 32 between the enterprise server 24 and the user equipment 30, and/or any communication channel between the user equipment 30 and the print server 20, may be closed. Alternatively, one or both of those connections may be kept open for future use and/or for other uses.

Various modifications and variations can be made in the present invention without departing from the spirit or scope of the invention. For example, in the interests of simplicity, FIG. 1 does not show in detail components of network 12 that merely serve to route messages between the print server 20, the enterprise server 24, and the user equipment 30, but such components may be present. Similarly, additional servers that may be consulted to obtain address or routing information, or that may contain location data about available printers 22, are not shown but may be present.

In FIG. 1, the transmitter/receiver 16 and the print server 20 are shown as being independently connected to the network 12. In a hotspot 18, the transmitter/receiver 16 and the print server 20 may physically be in a single unit with a common point of connection to the network 12, or may be in a smaller network with a common point of connection to the network 12.

In FIG. 1, the printer 22 and the print server 20 are shown as separate units. The print server 20 may alternatively be a functionality of the printer 22.

Thus, it is intended that the present invention cover the modifications and variations of this invention provided they come within the scope of the appended claims and their equivalents.

What is claimed is:

1. A method of printing in a network comprising:
    establishing a two-way connection from a user equipment to a printing system, wherein the printing system is not trusted by a firewall and the user equipment is trusted by the firewall;
    establishing a secure connection between the user equipment and a server protected by the firewall;
    from the user equipment, selecting a file on the server;
    from the user equipment, passing information to the printing system, the information comprising a reference to the file including an address of the user equipment in the network and a path from the printing system via the user equipment to the server for acquiring the file;
    causing the printing system to generate and send to the user equipment a request for the server to supply the printing system with a copy of the file, the request identifying the file by the reference;
    causing the user equipment to read and authenticate the request;
    causing the user equipment to send the request to the server, wherein the request appears to the server to be coming from the user equipment within the network; and
    causing the printing system to print the file.

2. A method according to claim 1, wherein establishing the two-way connection from the user equipment to the printing system comprises a user of the user equipment locating a nearby printer.

3. A method according to claim 1, wherein the firewall would prevent the printing system from retrieving the file directly, and establishing the secure connection comprises establishing a connection by which the firewall permits the file to be retrieved.

4. A method according to claim 3, wherein establishing the connection by which the firewall permits the file to be retrieved comprises establishing a virtual private network comprising the server and the user equipment.

5. A method according to claim 1, wherein the path from the printing system to the server via the user equipment identifies a name of the file and an indication of a location of the file in the network.

6. A method according to claim 5, wherein the indication of the location of the file in the network is in a form recognizable to the user equipment, the user equipment substituting a location of the file recognizable to the server.

7. A method according to claim 1, wherein the printing system comprises a printer and a print server configured to convert information in the file into a form intelligible to the printer.

8. A method according to claim 1, further comprising:
in response to the request, causing the server to send data packets of the file via the user equipment; and
in response to the user equipment receiving data packets from the server over a first period of time, relaying the data packets to the printing system over a second period of time overlapping the first period of time, in such a manner that a file larger than a data storage capacity of the user equipment can be relayed.

9. A system for printing in a network comprising:
a printer arranged to receive information indicating a file and a path to the file, to retrieve the file along the path, and to print from the file, wherein the printer is not trusted by a firewall;
a server arranged to supply the file only over a secure connection, and protected by the firewall; and
user equipment trusted by the firewall and arranged to establish two-way communication with the printer and a secure connection with the server, to permit a user to specify the printer and the file, to receive a request from the printer identifying the file by reference for the server to supply the printer with a copy of the file, to read and authenticate the request, to send the request to the server, to pass to the printer a message indicating the specified file and the path from the printer via the user equipment to the server, and to relay data packets of the file supplied by the server to the printer,
wherein the request appears to the server to be coming from the user equipment.

10. A system according to claim 9, wherein the printer is in the vicinity of the user equipment.

11. A system according to claim 9, wherein the firewall is arranged to permit data packets of the file to be supplied only to a device trusted by the enterprise network, and wherein the request for the file routed according to the path via the trusted user equipment appears to the firewall to be a request by the trusted user equipment.

12. A system according to claim 9, wherein the user equipment is arranged to indicate the path from the printer to the server via the user equipment by sending the information indicating the specified file in a message including a current address of the user equipment.

13. A system according to claim 9, wherein the printer comprises a print server, wherein the print server is arranged to convert information in the specified file into a form intelligible to the printer.

14. A system according to claim 9, wherein the user equipment is arranged to receive data packets of the file from the server over a first period of time and relay the data packets of the file to the printer over a second period of time overlapping the first period of time, in such a manner that a file larger than a data storage capacity of the user equipment can be relayed.

15. A user equipment for printing in a network, the user equipment including: a processor; and a memory storing computer-executable instructions that when executed cause the processor to:
establish a two-way communication with a print server, wherein the print server is not trusted by the firewall and the user equipment is trusted by the firewall;
establish a secure connection with a data server protected by the firewall;
permit a user of the user equipment to specify a printer associated with the print server and data on the data server;
permit a user of the user equipment to select a file on the data server;
receive a request from the printer identifying the file by reference for the data server to supply the printer with a copy of the file;
read and validate the request to determine if the request is valid;
send the request to the server in response to a successful validation;
pass to the print server a message indicating the specified data and a path from the print server via the user equipment to the data server for acquiring the data;
relay packets of the data supplied over the secure connection by the data server to the print server,
wherein the request appears to the server to be coming from the user equipment.

16. The user equipment according to claim 15, wherein the user equipment is arranged to identify itself to the data server and to establish a secure communication channel to and from the data server.

17. The user equipment according to claim 15, wherein the user equipment is arranged to indicate the path by sending the information indicating the data in a message including a path containing the user equipment.

18. The user equipment according to claim 15 that is arranged to receive data over a first period of time and relay the data over a second period of time overlapping the first period of time, in such a manner that data exceeding a data storage capacity of the user equipment can be relayed.

19. A system for printing in a network comprising:
a printing device to receive information indicating a data file and a communication path to the data file, to retrieve the indicated file over the indicated path, and to print information from the data file, wherein the printing device is not trusted by a firewall;
a data server to supply the data file only in response to an appropriate request, wherein the data server is protected by the firewall; and
user equipment trusted by the firewall to establish two-way communication with the printing device and the data server to permit a user to specify the printing device and the data file, to receive a request from a printer identifying the data file by reference for the data server to supply the printing device with a copy of the data file, to read and validate the request to determine if the request is valid, to send the request to the data server in response to a successful validation, to pass to the printing device a message indicating the specified data file and a path from the printing device to the data server via the user equipment, and for the data file supplied by the data server to the printing device, wherein the request appears to the data server to be coming from the user equipping means.

20. A system according to claim 19, wherein the firewall permits the data file to be supplied in response to the request relayed from the user equipment and for preventing the data file being supplied in response to a request from the printing device by another path.

21. A system according to claim 19, wherein the user equipment is arranged to indicate the path from the printing device to the data server via the user equipment by sending the information indicating the file in a message including a return path containing at least the user equipment and the data server.

\* \* \* \* \*